US010341333B2

(12) United States Patent
Tommy et al.

(10) Patent No.: US 10,341,333 B2
(45) Date of Patent: Jul. 2, 2019

(54) SYSTEMS AND METHODS FOR GENERATING MULTI-DIMENSIONAL PASSWORD AND AUTHENTICATING THEREOF

(71) Applicant: Tata Consultancy Services Limited, Mumbai (IN)

(72) Inventors: Robin Tommy, Trivandrum (IN); Vansh Johri, Trivandrum (IN)

(73) Assignee: Tata Consultancy Services Limited, Mumbai (IN)

(*) Notice: Subject to any disclaimer, the term of this patent is extended or adjusted under 35 U.S.C. 154(b) by 61 days.

(21) Appl. No.: 15/466,698

(22) Filed: Mar. 22, 2017

(65) Prior Publication Data
US 2018/0109510 A1 Apr. 19, 2018

(30) Foreign Application Priority Data
Oct. 18, 2016 (IN) .............................. 201621035603

(51) Int. Cl.
*G06F 21/00* (2013.01)
*H04L 29/06* (2006.01)
(Continued)

(52) U.S. Cl.
CPC ........ *H04L 63/083* (2013.01); *G06F 3/04815* (2013.01); *G06F 21/316* (2013.01);
(Continued)

(58) Field of Classification Search
CPC . H04L 63/083; G06F 21/316; G06F 3/04815; G06F 3/04845; G06F 3/012; G06F 3/013; G06F 3/0482
See application file for complete search history.

(56) References Cited

U.S. PATENT DOCUMENTS 9,539,500 B2 * 1/2017 Leyvand ............ G06K 9/00221
9,871,774 B1 * 1/2018 Liu ..................... H04L 63/0435
(Continued)

OTHER PUBLICATIONS

Gopinadhan et al., "Passaction: A New User Authentication Strategy Based on 3D Virtual Environment", IRACST—International Journal of Computer Science and Information Technology & Security (IJCSITS), vol. 2, issue 2, pp. 282-285, (2012).
(Continued)

*Primary Examiner* — Brandon S Hoffman
*Assistant Examiner* — William A Corum, Jr.
(74) *Attorney, Agent, or Firm* — Finnegan, Henderson, Farabow, Garrett & Dunner LLP (57) ABSTRACT

Systems and methods for multi-dimensional password generation and authentication is provided. The method includes selecting a virtual reality (VR) environment, rendering interactive objects in the VR environment, tracking a first set of activities including user behavior, user interaction with the objects, and changes made to the objects, the behavior including user position(s), head rotation, time spent on a particular position, GPS coordinates, and the changes include one of position, shape, color, and rotation of the objects. The method generates a multi-dimensional password based on the first set of tracked activities, and authenticates based on comparison of a second set of tracked activities and the first set of activities. When the comparison results in mismatch, the system generates a one-time multi-dimensional image, based on which a third set of activities are tracked and compared with the first set of activities for resetting the password or authenticating the user accordingly.

7 Claims, 3 Drawing Sheets

(51) Int. Cl.
  *G06F 3/0481* (2013.01)
  *G06F 21/31* (2013.01)
  *G06F 3/01* (2006.01)
  *G06F 3/0482* (2013.01)
  *G06F 3/0484* (2013.01)

(52) U.S. Cl.
  CPC .............. *G06F 3/012* (2013.01); *G06F 3/013* (2013.01); *G06F 3/0482* (2013.01); *G06F 3/04845* (2013.01)

(56) References Cited

U.S. PATENT DOCUMENTS

| | | |
|---|---|---|
| 2013/0044055 A1 | 2/2013 | Karmarkar et al. |
| 2014/0289834 A1 | 9/2014 | Lindemann et al. |
| 2015/0089607 A1 | 3/2015 | Hubner et al. |
| 2015/0153571 A1* | 6/2015 | Ballard ................. H04W 76/10 345/8 |
| 2015/0227735 A1* | 8/2015 | Chappell ................. G06F 21/32 726/19 |
| 2016/0188865 A1* | 6/2016 | Tao ......................... G06F 21/36 726/19 |
| 2017/0318019 A1* | 11/2017 | Gordon .............. G06K 9/00617 |

OTHER PUBLICATIONS

Khatpe et al., "3D Login for More Secure Authentication", International Journal of Innovative Research in Computer and Communication Engineering, vol. 2, issue 2, pp. 2992-3000, (2014).

Kumawat et al., "3D Graphical Password Authentication System", International Journal for Research in Applied Science & Engineering Technology (IJRASET), vol. 3, issue IV, pp. 319-325, (2015).

Kognule et al., "3D Password", International Conference on Advances in Communication and Computing Technologies, Proceedings published by International Journal of Computer Applications® (IJCA), pp. 6-10, (2012).

* cited by examiner

SYSTEMS AND METHODS FOR GENERATING MULTI-DIMENSIONAL PASSWORD AND AUTHENTICATING THEREOF

PRIORITY CLAIM

This U.S. Patent application claims priority under 35 U.S.C. § 119 to India Application No. 201621035603, filed on Oct. 18, 2016. The entire contents of the aforementioned application are incorporated herein by reference.

TECHNICAL FIELD

The disclosure herein generally relate to password generation and authentication systems, and, more particularly, to systems and methods for generating multi-dimensional passwords and authenticating techniques thereof.

BACKGROUND

Security enhancements are generally provided by way of authentication of users. Such authentication requires users to login by entering credentials such as username and/or a password for authorization of access to a computing system, and the like. Passwords are required to be chosen carefully so that it is hard for a person to hack or crack the same. In order to prevent unauthorized access effectively, conventional systems and methods have generated passwords that are preferably a complex combination of alphanumeric characters. Keyboard logging or keystroke logging is a process of recording key entries of legitimate users without their knowledge. In conventional systems, empty fields are provided where users are required to provide login name and password. User inputs are provisioned by the most commonly recognized keyboard from its inception to this day which is the QWERTY keyboard and/or a numerical keypad. With the advancement of technology, users are now able to use a virtual keyboard (also referred to as an onscreen keyboard). However, users continue to enter credentials in a conventional manner to log into a system. Such conventional keyboard systems risk leaking of passwords, thereby causing high security concerns.

During the process of entering the credentials, generally there are a lot of interceptions from unauthorized users which may result in shoulder surfing. Shoulder surfing is a practice, where an observer simply watches (or spies) the keyboard entries to learn the credentials entered by an authentic (or authorized) user. The potential risk of shoulder surfing is elevated when conventional keyboards are used. There are several approaches taken to improve keyboards, but these approaches are not foolproof, further remain ineffective, and to a large extent are unsuccessful in enhanced security for presenting and inputting of data.

SUMMARY

Embodiments of the present disclosure present technological improvements as solutions to one or more of the above-mentioned technical problems recognized by the inventors in conventional systems. In view of the foregoing, embodiments herein provide a system and method for generating multi-dimensional password and authenticating thereof.

For example, in one embodiment, a method for multi-dimensional password generation and authentication of a user is provided. The processor implemented method comprising: (a) processing, a selection by a user, a virtual reality (VR) environment from one or more virtual reality (VR) environments pre-stored in a database; (b) presenting a graphical user interface comprising the selected VR environment on a display and dynamically rendering one or more interactive objects, wherein the one or more interactive objects are identified and positioned in the selected VR environments based on a type of the selected VR environment; (c) tracking a first set of activities comprising (i) behavior of the user, (ii) interaction of the user with at least a subset of the one or more interactive objects, and (iii) one or more changes made to the one or more interactive objects in the selected VR environment, wherein the behavior comprises one or more positions of the user, head rotation, time spent on a particular position, one or more corresponding GPS coordinates, and wherein the one or more changes comprises at least one of (a) position, (b) shape, (c) color, and (d) rotation of the one or more objects; (d) generating a multi-dimensional password based on the first set of tracked activities; and (e) communicating the multi-dimensional password to the user, and obtaining a confirmation from the user and storing the multi-dimensional password with the first set of tracked activities in the database.

In an embodiment, the processor implemented method further comprises (f) processing a request for login by the user; (g) automatically presenting the selected VR environment and rendering a set of interactive objects on a display to the user based on the request, wherein the set of interactive objects comprises at least a subset of interactive objects that are previously interacted by the user when the multi-dimensional password was generated; (h) tracking a second set of activities comprising (i) behavior of the user, (ii) interaction of the user with the set of interactive objects, and (iii) one or more changes made to the set of interactive objects in the virtual reality (VR) environment, wherein the behavior comprises one or more positions of the user, head rotation, time spent on a particular position, one or more corresponding GPS coordinates, and wherein the one or more changes comprises at least one of (a) position, (b) shape, (c) color, and (d) rotation of one or more objects; (i) performing a first comparison of (i) the second set of tracked activities and (ii) the first set of tracked activities that are previously stored in the database; and (j) authenticating the user based on the first comparison.

In an embodiment, the step of authenticating the user based on the first comparison comprises authenticating the user when the second set of tracked activities matches at least a substantial portion of the first set of tracked activities.

In an embodiment, when the first comparison of (i) the first set of tracked activities and (ii) the second set of tracked activities results in a mismatch, the method comprises: determining number of attempts made by the user to perform the second set of activities; and enabling, based on the number of attempts, at least one of (i) resetting of the multi-dimensional password by the user, or performing the steps (f)-(j).

In an embodiment, the step of resetting of the multi-dimensional password by the user comprises: presenting an option to generate a one-time multi-dimensional image; generating the one-time multi-dimensional image upon obtaining a confirmation from the user based on the option, wherein the one-time multi-dimensional image comprises at least a portion of sequence of one or more interactive objects that are previously interacted by the user when the multi-dimensional password was generated; tracking a third set of activities comprising at least one of (i) behavior of the user, (ii) interaction of the user with at least a subset of one or more interactive objects, and wherein the behavior comprises one or more positions of the user, head rotation, time spent on a particular position, one or more corresponding GPS coordinates; and performing a second comparison of (i) the third set of tracked activities and (ii) the first set of tracked activities and performing, based on the second comparison, at least one of (i) the steps of (a) to (e), or (ii) the steps of (f) to (j). In an embodiment, the steps of (a) to (e) are performed when the third set of tracked activities matches at least a substantial portion of the first set of tracked activities.

In another embodiment, a system for multi-dimensional password generation and authentication of a user is provided. The system comprising: a memory storing instructions; one or more communication interfaces; and one or more hardware processors coupled to the memory using the one or more communication interfaces, wherein the one or more hardware processors are configured by the instructions to (a) process, a selection by a user, a virtual reality (VR) environment from one or more virtual reality (VR) environments pre-stored in a database, (b) present a graphical user interface comprising the selected VR environment on a display and dynamically rendering one or more interactive objects, wherein the one or more interactive objects are identified and positioned in the selected VR environments based on a type of the selected VR environment, (c) track a first set of activities comprising (i) behavior of the user, (ii) interaction of the user with at least a subset of the one or more interactive objects, and (iii) one or more changes made to the one or more interactive objects in the selected VR environment, wherein the behavior comprises one or more positions of the user, head rotation, time spent on a particular position, one or more corresponding GPS coordinates, and wherein the one or more changes comprises at least one of (a) position, (b) shape, (c) color, and (d) rotation of the one or more objects, (d) generate a multi-dimensional password based on the first set of tracked activities, and (e) communicate the multi-dimensional password to the user, and obtaining a confirmation from the user and storing the multi-dimensional password with the first set of tracked activities in the database.

In an embodiment, the one or more hardware processors are further configured by the instructions to: (f) process a request for login by the user, (g) automatically present the selected VR environment and rendering a set of interactive objects on a display to the user based on the request, wherein the set of interactive objects comprises at least a subset of interactive objects that are previously interacted by the user when the multi-dimensional password was generated, (h) track a second set of activities comprising (i) behavior of the user, (ii) interaction of the user with the set of interactive objects, and (iii) one or more changes made to the set of interactive objects in the virtual reality (VR) environment, wherein the behavior comprises one or more positions of the user, head rotation, time spent on a particular position, one or more corresponding GPS coordinates, and wherein the one or more changes comprises at least one of (a) position, (b) shape, (c) color, and (d) rotation of one or more objects, (i) perform a first comparison of (i) the second set of tracked activities and (ii) the first set of tracked activities that are previously stored in the database, and (j) authenticate the user based on the first comparison.

In an embodiment, the step of authenticating the user based on the first comparison comprises authenticating the user when the second set of tracked activities matches at least a substantial portion of the first set of tracked activities. In an embodiment, when the first comparison of (i) the first set of tracked activities and (ii) the second set of tracked activities results in a mismatch, the one or more hardware processors are further configured by the instructions to: determine number of attempts made by the user to perform the second set of activities, and enable, based on the number of attempts, at least one of (i) resetting of the multi-dimensional password by the user, or performing the steps (f)-(j).

In an embodiment, the step of resetting of the multi-dimensional password by the user comprises: presenting an option to generate a one-time multi-dimensional image; generating the one-time multi-dimensional image upon obtaining a confirmation from the user based on the option, wherein the one-time multi-dimensional image comprises at least a portion of sequence of one or more interactive objects that are previously interacted by the user when the multi-dimensional password was generated; tracking a third set of activities comprising at least one of (i) behavior of the user, (ii) interaction of the user with at least a subset of one or more interactive objects, and wherein the behavior comprises one or more positions of the user, head rotation, time spent on a particular position, one or more corresponding GPS coordinates; and performing a second comparison of (i) the third set of tracked activities and (ii) the first set of tracked activities and performing, based on the second comparison, at least one of (i) the steps of (a) to (e), or (ii) the steps of (f) to (j).

In an embodiment, the steps of (a) to (e) are performed when the third set of tracked activities matches at least a substantial portion of the first set of tracked activities.

In yet another embodiment, one or more non-transitory machine readable information storage mediums comprising one or more instructions is provided. The one or more instructions which when executed by one or more hardware processors causes (a) processing, a selection by a user, a virtual reality (VR) environment from one or more virtual reality (VR) environments pre-stored in a database; (b) presenting a graphical user interface comprising the selected VR environment on a display and dynamically rendering one or more interactive objects, wherein the one or more interactive objects are identified and positioned in the selected VR environments based on a type of the selected VR environment; (c) tracking a first set of activities comprising (i) behavior of the user, (ii) interaction of the user with at least a subset of the one or more interactive objects, and (iii) one or more changes made to the one or more interactive objects in the selected VR environment, wherein the behavior comprises one or more positions of the user, head rotation, time spent on a particular position, one or more corresponding GPS coordinates, and wherein the one or more changes comprises at least one of (a) position, (b) shape, (c) color, and (d) rotation of the one or more objects; (d) generating a multi-dimensional password based on the first set of tracked activities; and (e) communicating the multi-dimensional password to the user, and obtaining a confirmation from the user and storing the multi-dimensional password with the first set of tracked activities in the database.

In an embodiment, the one or more instructions which when executed by one or more hardware processors further causes: (f) processing a request for login by the user; (g) automatically presenting the selected VR environment and rendering a set of interactive objects on a display to the user based on the request, wherein the set of interactive objects comprises at least a subset of interactive objects that are previously interacted by the user when the multi-dimensional password was generated; (h) tracking a second set of activities comprising (i) behavior of the user, (ii) interaction of the user with the set of interactive objects, and (iii) one or more changes made to the set of interactive objects in the virtual reality (VR) environment, wherein the behavior comprises one or more positions of the user, head rotation, time spent on a particular position, one or more corresponding GPS coordinates, and wherein the one or more changes comprises at least one of (a) position, (b) shape, (c) color, and (d) rotation of one or more objects; (i) performing a first comparison of (i) the second set of tracked activities and (ii) the first set of tracked activities that are previously stored in the database; and (j) authenticating the user based on the first comparison.

In an embodiment, the step of authenticating the user based on the first comparison comprises authenticating the user when the second set of tracked activities matches at least a substantial portion of the first set of tracked activities.

In an embodiment, when the first comparison of (i) the first set of tracked activities and (ii) the second set of tracked activities results in a mismatch, the one or more instructions which when executed by one or more hardware processors further causes: determining number of attempts made by the user to perform the second set of activities; and enabling, based on the number of attempts, at least one of (i) resetting of the multi-dimensional password by the user, or performing the steps (f)-(j).

In an embodiment, the step of resetting of the multi-dimensional password by the user comprises: presenting an option to generate a one-time multi-dimensional image; generating the one-time multi-dimensional image upon obtaining a confirmation from the user based on the option, wherein the one-time multi-dimensional image comprises at least a portion of sequence of one or more interactive objects that are previously interacted by the user when the multi-dimensional password was generated; tracking a third set of activities comprising at least one of (i) behavior of the user, (ii) interaction of the user with at least a subset of one or more interactive objects, and wherein the behavior comprises one or more positions of the user, head rotation, time spent on a particular position, one or more corresponding GPS coordinates; and performing a second comparison of (i) the third set of tracked activities and (ii) the first set of tracked activities and performing, based on the second comparison, at least one of (i) the steps of (a) to (e), or (ii) the steps of (f) to (j). In an embodiment, the steps of (a) to (e) are performed when the third set of tracked activities matches at least a substantial portion of the first set of tracked activities.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
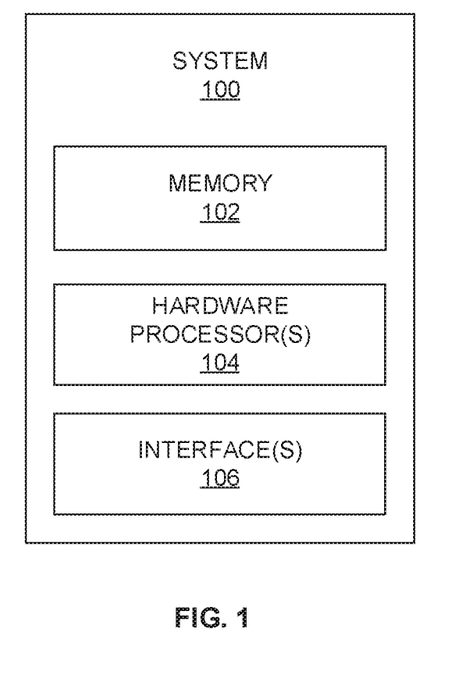
FIG. 1 illustrates an exemplary block diagram of a system for generating a multi-dimensional password and authenticating thereof according to an embodiment of the present disclosure.
Figure 2A:
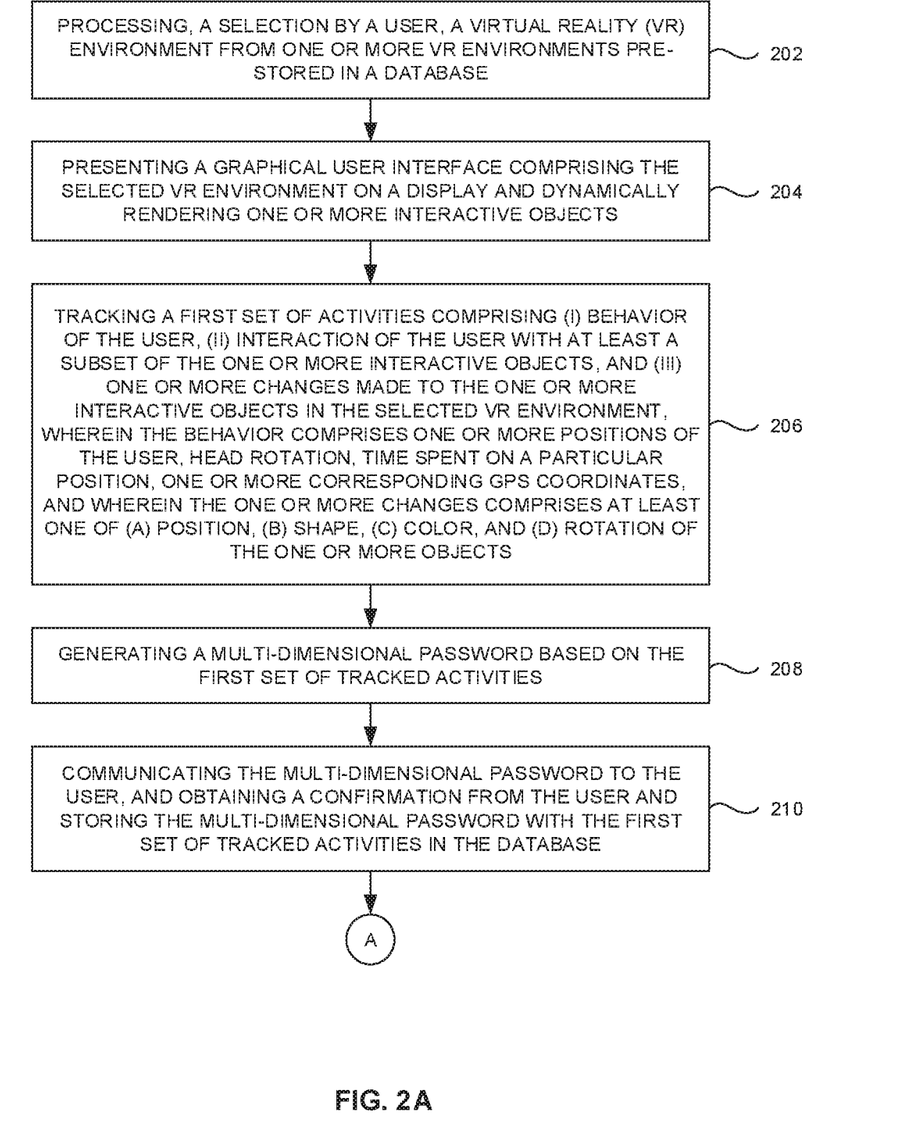
FIGS. 2A and 2B illustrate an exemplary flow diagram of a method for generating a multi-dimensional password and authenticating thereof using the system of FIG. 1 in accordance with an embodiment of the present disclosure.
Figure 2B:
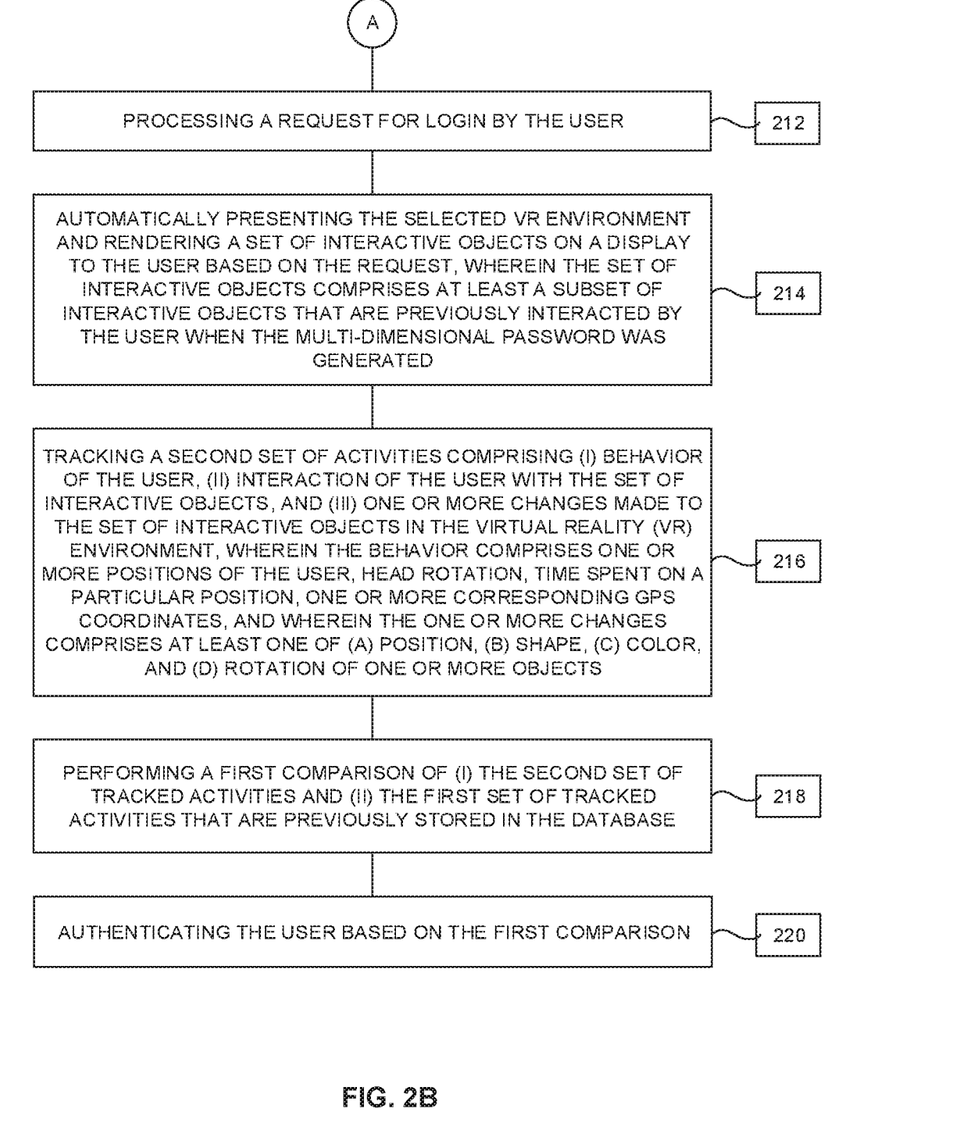

Referring now to the drawings, and more particularly to FIG. 1 through 2, where similar reference characters denote corresponding features consistently throughout the figures, there are shown preferred embodiments and these embodiments are described in the context of the following exemplary system and/or method.

FIG. 1 illustrates an exemplary block diagram of a system 100 for generating a multi-dimensional password and authenticating thereof according to an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

FIG. 2, with reference to FIG. 1, illustrates an exemplary flow diagram of a method for generating a multi-dimensional password and authenticating thereof using the system 100 of FIG. 1 in accordance with an embodiment of the present disclosure. In an embodiment, the system 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the flow diagram. In an embodiment of the present disclosure, at step 202, the one or more processors 104 process, a selection by a user, a virtual reality (VR) environment from one or more virtual reality (VR) environments pre-stored in a database. In an embodiment of the present disclosure, the database is stored in the memory 102. In an embodiment, the one or more VR environments may comprise, but are not limited to, office, home, classroom, and the like. In response to selection of a VR environment by the user, the one or more processors 104 at step 204, present a graphical user interface comprising the selected VR environment on a display and dynamically render one or more interactive objects. In an embodiment of the present disclosure, the one or more interactive objects are identified and positioned in the selected VR environments based on a type of the selected VR environment. In one example, when the user selects a classroom type VR environment, then the one or more interactive objects may be identified as board, table, chairs, and the like and are positioned accordingly. In another example, when the user selects an office type VR environment, then the one or more interactive objects may be identified as workstation(s), chair(s), laptop(s), meeting room(s), drawer(s), plug point(s), stationery (or office materials—such as whiteboard, marker(s), duster(s), and the like), wall mounting(s), and the like. The user may then be promptly provided via a notification to interact with one or more interactive objects identified and positioned in the selected VR environment.

In an embodiment of the present disclosure, at step 206, the one or more processors 104, tracking a first set of activities comprising (i) behavior of the user, (ii) interaction of the user with at least a subset of said one or more interactive objects, and (iii) one or more changes made to the one or more interactive objects in the selected VR environment. In an embodiment of the present disclosure, the behavior comprises one or more positions of the user, head rotation, time spent on a particular position, and one or more corresponding global positioning system (GPS) coordinates. In an embodiment of the present disclosure, the one or more changes comprises at least one of (a) position, (b) shape, (c) color, and (d) rotation of the one or more interactive objects. In an embodiment of the present disclosure, the interaction, the behavior of the user, and the one or more changes may be tracked using a gaze input.

Based on the selected VR environment which in this case is office, the system 100 identifies and positions one or more interactive objects. In an embodiment of the present disclosure, the system 100 has detected/tracked the following activities, for example, the user has rotated his/her head by 20 degree on his/her right side, has taken 20 steps forward, presence of the user near Table A. In an embodiment, if user gaze at the Table A for more than 2 seconds, the system 100 may present object's control menu in the multi-dimensional space (e.g., 3D Space). Below is a table (e.g., Table 1) of the parameters indicative of changes made to one or more interactive objects in the office VR environment by the user, and are illustrated by way of examples:

TABLE 1

| Parameters | Initial | Final |
|---|---|---|
| Position | (20, 20, 30) | (30, 20, 30) |
| Rotation | (0, 0, 0) | (90, 0, 0) |
| Color | Red wood | Brown wood |
| Shape | Square | Round |

Now after Table A, there are two multiple ways to reach Chair B and the user takes left turn and moves 10 step forward towards the chair. Presence of user near the Chair B is detected, but user does not gaze on Chair B however the user has spent some time there. After this user confirms the password. Now the password may be generated based on the following information illustrated by way of example in Table 2:

TABLE 2

| Behavior | Position tracking | Objects Interacted |
|---|---|---|
| Head Rotation 20 degree right, GPS Coordinate 20 steps Forward | 20 Step Forward | Table A |
|  | 10 Step Forward | Changed Parameters: Position, Rotation, Color, Shape |
| Detected Object: Table A Interacted Object: Table A | | |

All the above information from Table 1 and Table 2 may constitute as the first set of tracked activities. In an embodiment of the present disclosure, at step 208, the one or more processors 104 generate a multi-dimensional password based on the first set of tracked activities. In an embodiment of the present disclosure, at step 210, the one or more processors 104 communicate the generated multi-dimensional password to the user, and obtain a confirmation from the user. The system 100 then stores the multi-dimensional password with the first set of tracked activities in the database. For example, the user, the multi-dimensional password, and the first set of tracked activities may be mapped and stored accordingly in the database. The multi-dimensional password may be generated for any type of application (locally hosted application(s), web application, and the like), file, folder, remote server, remote service, and the like for which the user intends to access.

In an embodiment of the present disclosure, at the end of the password generation process, details of the whole password may be provided to the user in a form of the multimedia content (e.g., a snapshot, an audio, a video, and combinations thereof). After confirmation of the user, the password is saved along with the multi-media content (e.g., snapshots of the objects interacted during the process of password generation). In an embodiment, the snapshots may be used in the case of lost password and in the concept of one-time image (OTI). In another embodiment, the snapshot may comprise an image of the object interacted, but not the details of changes made to it.

In an embodiment of the present disclosure, at step 212, the one or more processors 104 process a request for login by the user to initiate the one or more actions. The system 100 then automatically and dynamically renders one or more interactive objects based on the selected VR environment (e.g., office). The system 100 then tracks the second set of activities and compares these with the first set of activities to authenticate and authorize the user to access a file, folder, web application, and the like that are of interest. In an embodiment, the second set of tracked activities must have a substantial overlap for the system to authenticate and authorize the user. The system 100 may generate a first multi-dimensional vector pattern for the first set of tracked activities. Similarly, the system 100 may generate a second multi-dimensional vector pattern for the second set of tracked activities. The first and the second multi-dimensional vector pattern may be compared to determine an overlap in path/route, behavior, interaction of objects, changes made to objects, and the like, which is used by the system 100 to authenticate and authorize the user accordingly.

As mentioned above, when the user performs one or more actions (e.g., initiating a launch of an application, opening of a file or folder, at step 212, the one or more processors 104 process a request for login by the user to initiate the one or more actions. For example, assuming that the user has selected office type as a VR environment to generate a multi-dimensional password for accessing a web application to work on a project at office, the moment the user selects the web application, a login request gets initiated and the system 100 automatically (and/or intelligently) detects an event (e.g., launching of the web application), and queries database for a corresponding VR environment being mapped and stored in the database at the time of multi-dimensional password generation. In an embodiment of the present disclosure, at step 214, the one or more processors 104 automatically present the selected VR environment (e.g., office as a VR environment) and render a set of interactive objects on a display to the user based on the (login) request. In an embodiment, the set of interactive objects comprises at least a subset of interactive objects that were previously interacted by the user when the multi-dimensional password was generated.

In an embodiment of the present disclosure, the user may then be promptly provided via a notification to interact with the set of interactive objects identified and positioned in the selected VR environment (e.g., office). In an embodiment of the present disclosure, at step 216, the one or more processors 104 track a second set of activities comprising (i) behavior of the user, (ii) interaction of the user with the set of interactive objects, and (iii) one or more changes made to the set of interactive objects in the office type VR environment. In an embodiment of the present disclosure, the behavior may comprise, but are not limited to, one or more positions of the user (e.g., sitting at a work station), head rotation (head facing a computer being operated), time spent on a particular position, one or more corresponding GPS coordinates. In an embodiment, the one or more changes comprises at least one of (a) position, (b) shape, (c) color, and (d) rotation of one or more objects among the set of interactive objects. In an embodiment of the present disclosure, the changes may include, but are not limited to, performing one or more actions on a whiteboard comprising a to-do list, attaching a sticky note (made available on the workstation) to the whiteboard which are tracked as a second set of activities. It is to be understood that the current actions performed by the user may be previously performed by him/her at the time of multi-dimensional password generation.

In an embodiment of the present disclosure, at step 218, the one or more processors 104 then perform a first comparison of (i) the second set of tracked activities and (ii) the first set of tracked activities that are previously stored in the database. In an embodiment of the present disclosure, at step 220, the system 100 then authenticates the user (to access the web application) based on the first comparison. For example, when the one or more actions being performed on a whiteboard comprising a to-do list, attaching a sticky note (made available on the workstation) to the whiteboard which are match the first set of activities stored in the database wherein the first set of activities include actions that are identical to the actions from the second set of activities, the user is authenticated and authorized to access the web application. In an embodiment of the present disclosure, the step of authenticating said user based on said first comparison comprises authenticating the user when the second set of tracked activities matches at least a substantial portion of the first set of tracked activities. In one example, in the first set of tracked activities, the user may have strike through one work item (e.g.,) from a to-do list, and then would have interacted with a keyboard connected to a computer at the workstation. Whereas, in the second set of tracked activities, the action performed by the user may include the strike through that has been extended to a region beyond the words (e.g., ""), and then interacted with the keyboard connected to the computer. In such scenarios, the system 100 determines the level of accuracy, and interaction, and accordingly authenticates the user and authorizes the user to access the web application. In another example, in the first set of tracked activities, the user may have performed a strike through action on one work item (e.g., 2) from the to-do list, and typed on a screen of the computer using the keyboard. As can be seen the tracked activities includes a strike through done to words "module" and "tested" only and not to the numeric "2". Whereas during the tracking of second set of activities, the system 100 may have observed that the user has performed the strike through to all the words present for that work item as "", followed by typing using the keyboard. In such scenarios, the system 100 may prompt a hint to correct the action being performed, or determine the level of accuracy, and accordingly authenticates the user and authorizes the user to access the web application. In an embodiment, the hint may include a message being prompted on the display of the screen to correct the strike through of the words "module 2 tested".

When the first comparison of (i) the first set of tracked activities and (ii) the second set of tracked activities results in a mismatch, the one or more processors 104 determine number of attempts made by the user to perform the second set of activities, and enable based on the number of attempts, at least one of (i) resetting of the multi-dimensional password by the user, or performing the steps of 212 till 220 (e.g., login request, tracking the second set of activities, performing the first comparison, and authenticating) accordingly.

To reset the multi-dimensional password, the one or more processors 104 present an option to confirm for generating a one-time multi-dimensional image (OTI). The one or more processors 104 then generate the one-time multi-dimensional image upon obtaining a confirmation from the user based on the option. In an embodiment of the present disclosure, the one-time multi-dimensional image comprises at least a portion of sequence of one or more interactive objects that are previously interacted by the user when the multi-dimensional password was generated. In an embodiment of the present disclosure, upon generating and presenting the one-time multi-dimensional image, the user may be requested to interact with one or more objects in the one-time multi-dimensional image. In an embodiment of the present disclosure, the one or more processors 104 track a third set of activities comprising at least one of (i) behavior of the user, (ii) interaction of the user with at least a subset of one or more interactive objects in the one-time multi-dimensional image, and wherein the behavior comprises one or more positions of the user, head rotation, time spent on a particular position, one or more corresponding GPS coordinates, and the like.

In an embodiment of the present disclosure, the one or more processors 104 perform a second comparison of (i) the third set of tracked activities and (ii) the first set of tracked activities. Based on the comparison, the one or more processors 104 enable performing, at least one of (i) the steps of (202) to (210), or (ii) the steps of (212) to (220). In an embodiment of the present disclosure, the steps of (202) to (210) are performed when the third set of tracked activities matches at least a substantial portion of the first set of tracked activities.

As mentioned above, there may be instances the system 100 determines, based on the number of attempts, that the user has forgotten the password. In such scenarios, when user forgets the password, he/she may be asked to reset the password and provided with the option of OTI. In an embodiment of the present disclosure, the OTI may be the collage of the objects that he/she interacted with at the time of generation of the multi-dimensional password. In an embodiment, the OTI may further comprise the sequence of interaction but not the changes made on those objects. In an embodiment, the OTI may act as a hint to enter the forgotten password.

In an embodiment of the present disclosure, there may be instances where objects interacted during multi-dimensional password generation may vary from objects placed and interacted during authentication. For example, when the user wants to enter the multi-dimensional password for processing authentication and authorization, he/she opts to log in and gets a multi-dimensional (e.g., 3D) environment of office. The user may rotate his/her head by 20 and further takes 20 steps forward and finds a Sofa instead of Table A. User may look at that Sofa for more than 2 seconds, and perform the same changes in that Sofa as he/she has performed with Table A during password generation process. Further, the user takes left turn and moves 10 step forward, finds a Stool instead of Chair B, ignores it and may confirm the password.

The embodiments of the present disclosure provide systems and methods for generating multi-dimensional password and authenticating the user thereof. The system 100 reduces the possibility of hacking, and minimizes the reverse engineering scenario for finding out the password. The system 100 thus enables shoulder surfing proof, since only a specific authorized user having a computing device which is operated by him/her for accessing content in the selected VR environment.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method comprising:
   (a) processing, a selection by a user, a virtual reality (VR) environment from one or more virtual reality (VR) environments pre-stored in a database, by one or more hardware processors;
   (b) presenting, by the one or more hardware processors, a graphical user interface comprising the selected VR environment on a display and dynamically rendering one or more interactive objects, wherein the one or more interactive objects are identified and positioned in the selected VR environments based on a type of the selected VR environment;
   (c) tracking, by the one or more hardware processors, a first set of activities comprising (i) behavior of the user, (ii) interaction of the user with at least a subset of the one or more interactive objects, and (iii) one or more changes made to the one or more interactive objects in the selected VR environment, wherein the behavior comprises one or more of positions of the user, head rotation, time spent on a particular position, and one or more corresponding GPS coordinates, and wherein the one or more changes comprises at least one of (a) position, (b) shape, (c) color, and (d) rotation of the one or more interactive objects;
   (d) generating, by the one or more hardware processors, a multi-dimensional password based on the first set of tracked activities; and
   (e) communicating, by the one or more hardware processors, the multi-dimensional password and multi-media content including details of the multi-dimensional password to the user, and obtaining a confirmation from the user and storing the multi-dimensional password and the multi-media content with the first set of tracked activities in the database;
   (f) processing, by the one or more hardware processors, a request for login by the user;
   (g) automatically presenting, by the one or more hardware processors, the selected VR environment and rendering a set of interactive objects on a display to the user based on the request, wherein the set of interactive objects comprises at least a subset of interactive objects that are previously interacted by the user when the multi-dimensional password was generated;
   (h) tracking, by the one or more hardware processors, a second set of activities comprising (i) behavior of the user, (ii) interaction of the user with the set of interactive objects, and (iii) one or more changes made to the set of interactive objects in the virtual reality (VR) environment, wherein the behavior comprises one or more of positions of the user, head rotation, time spent on a particular position, and one or more corresponding GPS coordinates, and wherein the one or more changes comprises at least one of (a) position, (b) shape, (c) color, and (d) rotation of one or more interactive objects;
   (i) performing, by the one or more hardware processors, a first comparison of (i) the second set of tracked activities and (ii) the first set of tracked activities that are previously stored in the database; and
   (j) authenticating, by the one or more hardware processors, the user based on the first comparison;
   wherein when the first comparison of (i) the first set of tracked activities and (ii) the second set of tracked activities results in a mismatch, the method comprises:
   determining, by the one or more hardware processors, number of attempts made by the user to perform the second set of activities; and
   enabling, by the one or more hardware processors, based on the number of attempts, resetting of the multi-dimensional password by the user, wherein the step of resetting of the multi-dimensional password by the user comprises:
   presenting, by the one or more hardware processors, an option to generate a one-time multi-dimensional image;
   generating, by the one or more hardware processors, the one-time multi-dimensional image upon obtaining a confirmation from the user based on the option, wherein the one-time multi-dimensional image comprises at least a portion of sequence of the one or more interactive objects that are previously interacted by the user when the multi-dimensional password was generated;
   tracking, by the one or more hardware processors, a third set of activities comprising at least one of (i) behavior of the user, (ii) interaction of the user with at least a subset of one or more interactive objects, and wherein the behavior comprises one or more of positions of the user, head rotation, time spent on a particular position, and one or more corresponding GPS coordinates; and
   performing, by the one or more hardware processors, a second comparison of (i) the third set of tracked activities and (ii) the first set of tracked activities and performing, based on the second comparison, at least one of (i) the steps of (a) to (e), or (ii) the steps of (f) to (j).

2. The processor implemented method of claim 1, wherein the step of authenticating the user based on the first comparison comprises authenticating the user when the second set of tracked activities matches at least a portion of the first set of tracked activities.

3. The processor implemented method of claim 1, wherein the steps of (a) to (e) are performed when the third set of tracked activities matches at least a portion of the first set of tracked activities.

4. A system comprising:
   a memory storing instructions;
   one or more communication interfaces; and
   one or more hardware processors coupled to the memory using the one or more communication interfaces, wherein the one or more hardware processors are configured by the instructions to:
   (a) process, a selection by a user, a virtual reality (VR) environment from one or more virtual reality (VR) environments pre-stored in a database;
   (b) present a graphical user interface comprising the selected VR environment on a display and dynamically rendering one or more interactive objects, wherein the one or more interactive objects are identified and positioned in the selected VR environments based on a type of the selected VR environment;
   (c) track a first set of activities comprising (i) behavior of the user, (ii) interaction of the user with at least a subset of the one or more interactive objects, and (iii) one or more changes made to the one or more interactive objects in the selected VR environment, wherein the behavior comprises one or more of positions of the user, head rotation, time spent on a particular position, and one or more corresponding GPS coordinates, and wherein the one or more changes comprises at least one of (a) position, (b) shape, (c) color, and (d) rotation of the one or more interactive objects;
(d) generate a multi-dimensional password based on the first set of tracked activities; and
(e) communicate the multi-dimensional password and multi-media content including details of the multi-dimensional password to the user, and obtaining a confirmation from the user and storing the multi-dimensional password and the multi-media content with the first set of tracked activities in the database;
(f) process a request for login by the user;
(g) automatically present the selected VR environment and rendering a set of interactive objects on a display to the user based on the request, wherein the set of interactive objects comprises at least a subset of interactive objects that are previously interacted by the user when the multi-dimensional password was generated;
(h) track a second set of activities comprising (i) behavior of the user, (ii) interaction of the user with the set of interactive objects, and (iii) one or more changes made to the set of interactive objects in the virtual reality (VR) environment, wherein the behavior comprises one or more of positions of the user, head rotation, time spent on a particular position, and one or more corresponding GPS coordinates, and wherein the one or more changes comprises at least one of (a) position, (b) shape, (c) color, and (d) rotation of one or more interactive objects;
(i) perform a first comparison of (i) the second set of tracked activities and (ii) the first set of tracked activities that are previously stored in the database; and
(j) authenticate the user based on the first comparison;
when the first comparison of (i) the first set of tracked activities and (ii) the second set of tracked activities results in a mismatch, the one or more hardware processors are further configured by the instructions to:
determine number of attempts made by the user to perform the second set of activities; and
enable, based on the number of attempts, resetting of the multi-dimensional password by the user, wherein the step of resetting of the multi-dimensional password by the user comprises:
presenting an option to generate a one-time multi-dimensional image;
generating the one-time multi-dimensional image upon obtaining a confirmation from the user based on the option, wherein the one-time multi-dimensional image comprises at least a portion of sequence of the one or more interactive objects that are previously interacted by the user when the multi-dimensional password was generated;
tracking a third set of activities comprising at least one of (i) behavior of the user, (ii) interaction of the user with at least a subset of one or more interactive objects, and wherein the behavior comprises one or more of positions of the user, head rotation, time spent on a particular position, and one or more corresponding GPS coordinates; and
performing a second comparison of (i) the third set of tracked activities and (ii) the first set of tracked activities and performing, based on the second comparison, at least one of (i) the steps of (a) to (e), or (ii) the steps of (f) to (j).

5. The system of claim 4, wherein the step of authenticating the user based on the first comparison comprises authenticating the user when the second set of tracked activities matches at least a portion of the first set of tracked activities.

6. The system of claim 4, wherein the steps of (a) to (e) are performed when the third set of tracked activities matches at least a portion of the first set of tracked activities.

7. A non-transitory computer readable medium embodying a program executable in a computing device, the program comprising:
(a) a program code for processing, a selection by a user, a virtual reality (VR) environment from one or more virtual reality (VR) environments pre-stored in a database;
(b) a program code for presenting a graphical user interface comprising the selected VR environment on a display and dynamically rendering one or more interactive objects, wherein the one or more interactive objects are identified and positioned in the selected VR environments based on a type of the selected VR environment;
(c) a program code for tracking a first set of activities comprising (i) behavior of the user, (ii) interaction of the user with at least a subset of the one or more interactive objects, and (iii) one or more changes made to the one or more interactive objects in the selected VR environment, wherein the behavior comprises one or more of positions of the user, head rotation, time spent on a particular position, and one or more corresponding GPS coordinates, and wherein the one or more changes comprises at least one of (a) position, (b) shape, (c) color, and (d) rotation of the one or more interactive objects;
(d) a program code for generating a multi-dimensional password based on the first set of tracked activities; and
(e) a program code for communicating the multi-dimensional password and multi-media content including details of the multi-dimensional password to the user, and obtaining a confirmation from the user and storing the multi-dimensional password and the multi-media content with the first set of tracked activities in the database;
(f) a program code for processing a request for login by the user;
(g) a program code for automatically presenting the selected VR environment and rendering a set of interactive objects on a display to the user based on the request, wherein the set of interactive objects comprises at least a subset of interactive objects that are previously interacted by the user when the multi-dimensional password was generated;
(h) a program code for tracking a second set of activities comprising (i) behavior of the user, (ii) interaction of the user with the set of interactive objects, and (iii) one or more changes made to the set of interactive objects in the virtual reality (VR) environment, wherein the behavior comprises one or more of positions of the user, head rotation, time spent on a particular position, and one or more corresponding GPS coordinates, and wherein the one or more changes comprises at least one of (a) position, (b) shape, (c) color, and (d) rotation of one or more interactive objects;
(i) a program code for performing a first comparison of (i) the second set of tracked activities and (ii) the first set of tracked activities that are previously stored in the database; and
(j) a program code for authenticating the user based on the first comparison;

wherein when the first comparison of (i) the first set of tracked activities and (ii) the second set of tracked activities results in a mismatch, the program comprises:
   a program code for determining number of attempts made by the user to perform the second set of activities; and
   a program code for enabling, based on the number of attempts, resetting of the multi-dimensional password by the user, wherein the step of resetting of the multi-dimensional password by the user comprises:
a program code for presenting an option to generate a one-time multi-dimensional image;
a program code for generating the one-time multi-dimensional image upon obtaining a confirmation from the user based on the option, wherein the one-time multi-dimensional image comprises at least a portion of sequence of the one or more interactive objects that are previously interacted by the user when the multi-dimensional password was generated;
a program code for tracking a third set of activities comprising at least one of (i) behavior of the user, (ii) interaction of the user with at least a subset of one or more interactive objects, and wherein the behavior comprises one or more of positions of the user, head rotation, time spent on a particular position, and one or more corresponding GPS coordinates; and
a program code for performing a second comparison of (i) the third set of tracked activities and (ii) the first set of tracked activities and performing, based on the second comparison, at least one of (i) the steps of (a) to (e), or (ii) the steps of (f) to (j).

* * * * *